United States Patent [19]

D'Hollander

[11] 3,977,544

[45] Aug. 31, 1976

[54] ENTIRELY HYDRAULIC LOADING PLATFORM FOR TRUCKS

[76] Inventor: Omer A. E. D'Hollander, Gentstraat 25 A, 9180 Belsele, Belgium

[22] Filed: Feb. 11, 1975

[21] Appl. No.: 549,024

[52] U.S. Cl. ................... 214/77 P; 60/420; 91/411 A; 91/412; 214/763; 214/771; 214/DIG. 10; 254/124
[51] Int. Cl.² ........................................ B60P 1/44
[58] Field of Search ............ 214/77 R, 77 P, 763, 214/764, 771, DIG. 10; 91/411 A, 412; 60/420; 254/124, 93 R

[56] References Cited
UNITED STATES PATENTS

| | | | |
|---|---|---|---|
| 2,684,770 | 7/1954 | Park | 214/77 P |
| 2,798,626 | 7/1957 | Lapsley | 214/771 |
| 2,826,316 | 3/1958 | Wood | 214/77 P |
| 3,451,572 | 6/1969 | Rossoni | 214/77 P X |
| 3,666,122 | 5/1972 | Youmans | 214/77 R |
| 3,710,690 | 1/1973 | Dye | 91/411 A |

FOREIGN PATENTS OR APPLICATIONS

| | | |
|---|---|---|
| 2,012,816 | 3/1970 | France |
| 883,952 | 12/1961 | United Kingdom |
| 1,027,999 | 5/1966 | United Kingdom |

*Primary Examiner*—L. J. Paperner

[57] ABSTRACT

The invention pertains to a loading platform for a truck. Said platform is carried by the truck by a set of levers actuated by at least one hydraulic jack. A further hydraulic cylinder acts on said levers, said cylinder having a first and a second chamber, respectively containing a first and a second piston. The rod of the first piston extends into the second chamber while the rod of the second piston is pivotably connected to the platform. The cross-sectional surface of said first piston is larger than that of said jack, while the cross-sectional surface of the second piston is larger than that of the rod of the first piston but smaller than that of the latter.

4 Claims, 10 Drawing Figures

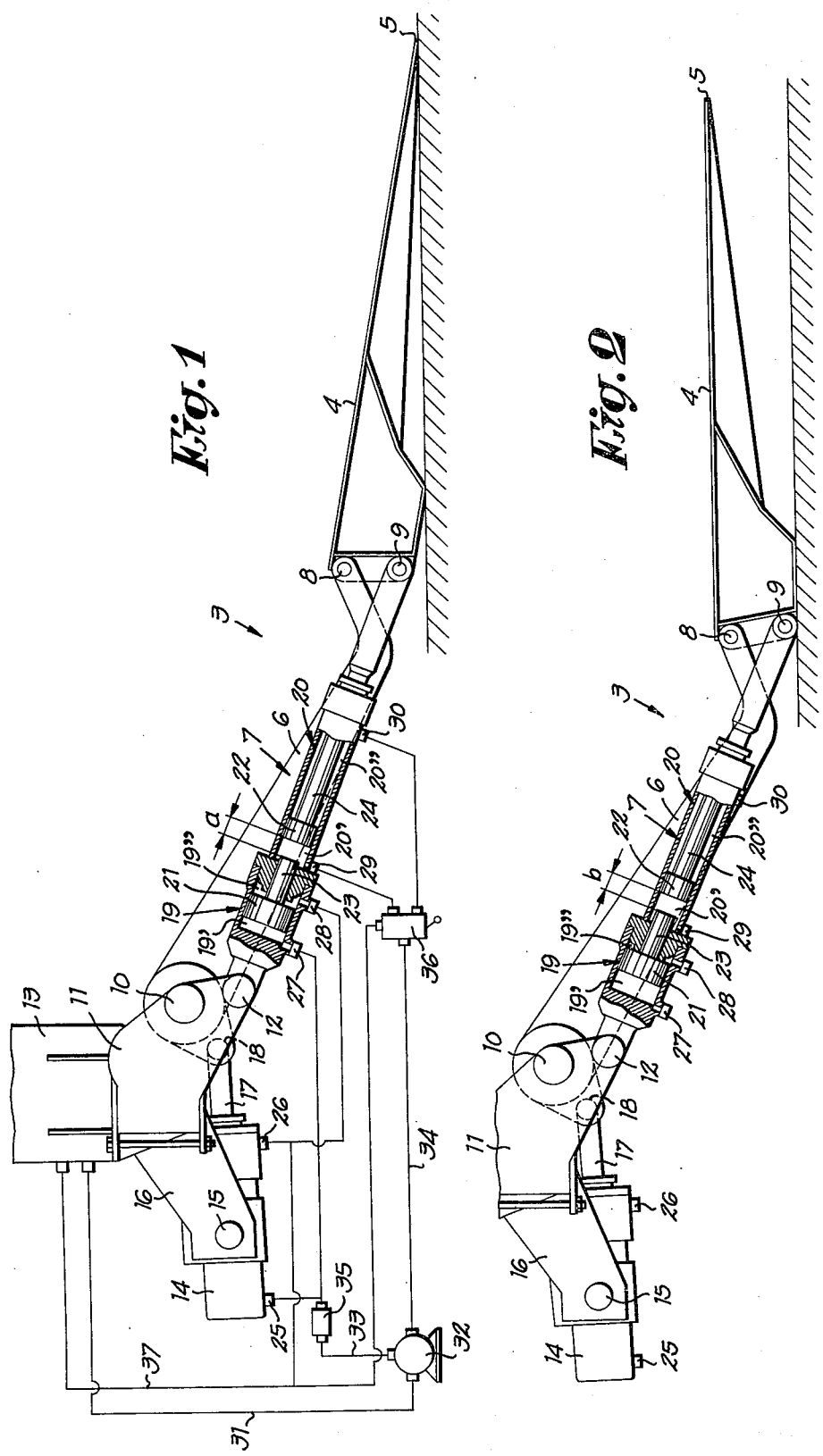

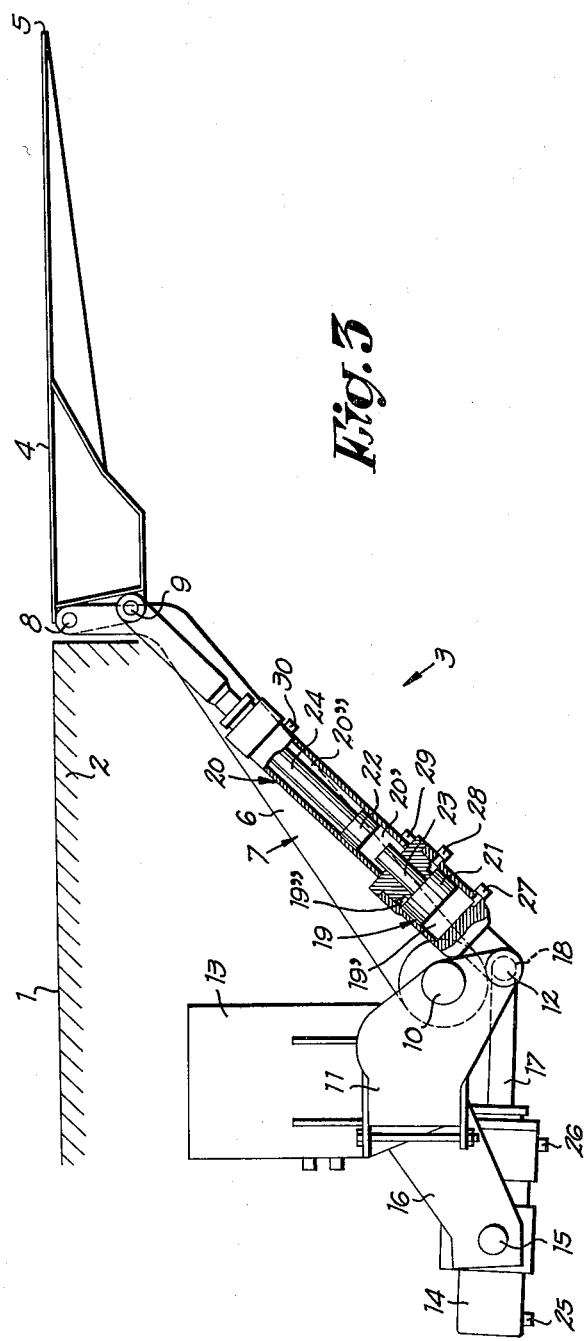

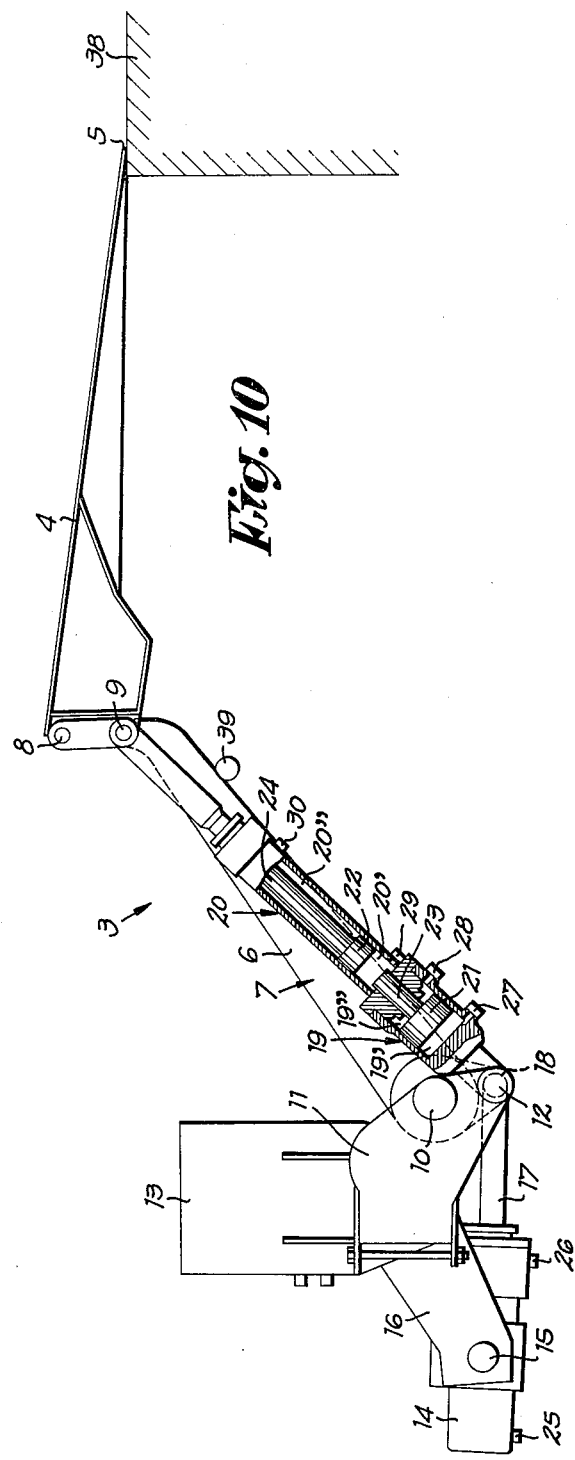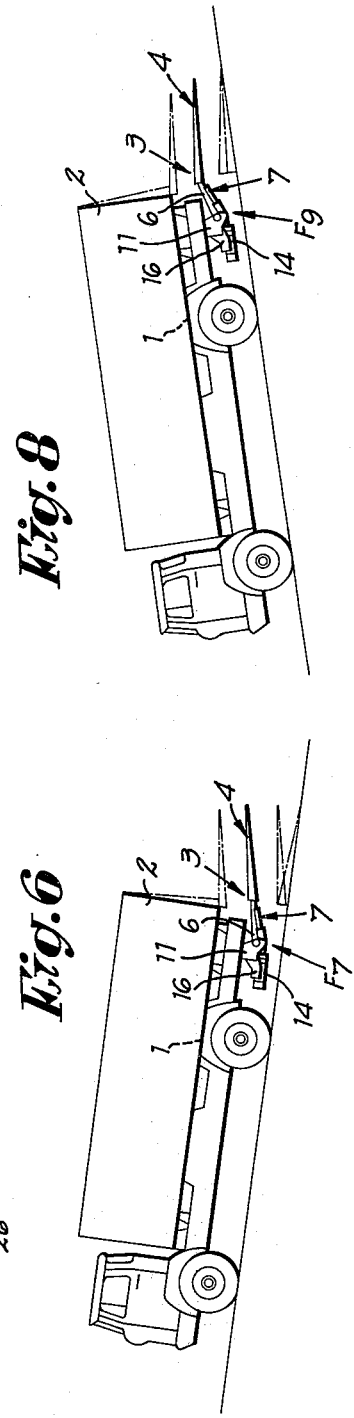

ENTIRELY HYDRAULIC LOADING PLATFORM FOR TRUCKS

The present invention is concerned with a hydraulic loading platform of the type which is provided at the rear end of trucks and which can be moved in a horizontal or almost horizontal position from the height of the truck floor down to ground level, and which can be brought into vertical position against the rear wall of the truck for transportation conditions.

Although the known types of loading platform are generally quite satisfactory, they do have certain drawbacks which are totally eliminated according to the present invention.

The first advantage of the loading platform according to the invention is that it is entirely hydraulic, i.e., that the control thereof can only be effected hydraulically, without the slightest mechanical intervention.

Another advantage of the loading platform according to the invention is that its position can be adjusted to any appropriate height, which means that it can be brought into any required position with respect to the truck.

Another advantage of the loading platform according to the invention is that whatever the position to which it has been adjusted, it can always be displaced parallel to itself.

Yet a further advantage of the invention is that whenever the loading platform comes into contact with some fixed point, generally the ground, it will automatically lower further by its own weight until the drive-up edge is in contact with the ground.

Yet a further advantage of the loading platform according to the invention is that under all circumstances it will always return to the position corresponding to the adjusted position.

Still another advantage of the invention is finally that for certain particular purposes a very great incline of the loading platform itself can be obtained, for instance when the loading platform has to be used in cooperation with a loading quay or suchlike, whilst the truck is located on a sloping surface, etc.

Due to the above-mentioned advantages of the loading platform according to the invention, a loading platform is obtained which, amongst others, as a consequence of the absence of mechanical control elements, requires less maintenance, is less subject to wear, is cheaper to construct, operates much more reliably, and with which a much greater slope can be obtained than is at present the case with loading platforms on which such adjustments must be made mechanically and with which it is moreover possible to work whilst the truck is on sloping ground.

These and other advantages are obtained with an entirely hydraulic loading platform according to the invention whereby, with this purpose in view, this loading platform is characterized by the fact that the cylinder or cylinders which are fitted between the loading platform and a fixed point consist of two parts each provided with a piston and separate inlets and outlets, whereby the piston rod of the piston of the lower part or chamber is connected to the loading platform, whereas the piston rod of the piston of the upper part or chamber extends into the lower part, in fact behind the piston of aforesaid lower part.

With the purpose of more clearly defining the characteristics of the invention, but without the slightest intent at limitation, a preferred form of embodiment is described hereinafter with reference to the appended drawings in which:

FIGS. 1 to 5 illustrate various characteristic positions of the loading platform according to the invention;

FIGS. 6 and 8 show two particular positions of trucks equipped with a loading platform according to the invention;

FIGS. 7 and 9 illustrate, to a larger scale, and partially in cross-section, those parts in FIGS. 6 and 8 shown respectively at F7 and F9;

FIG. 10 is a view of the loading platform when used at a loading quay.

Figure 4:
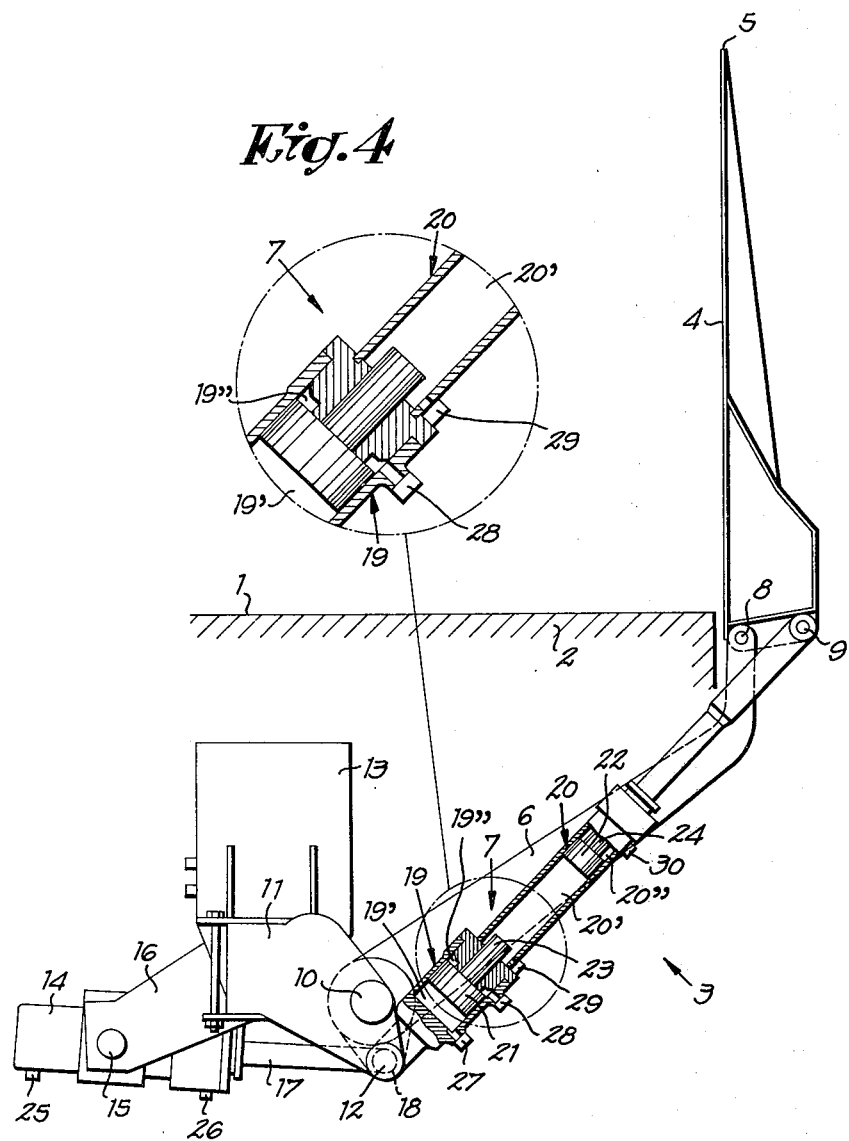

As illustrated in the accompanying drawings, a loading platform 3 according to the invention is fitted to a truck 2 opposite to the loading floor 1 of the latter.

In this form of embodiment the loading platform consists mainly of an actual loading surface 4 of which the leading or drive-up edge 5 is made as thin as possible and of which the rear part is also as small as possible in height.

At each side the loading surface 4 is connected to a parallelogram linkage consisting on the one hand of a lever 6 and on the other hand of a hydraulic correction cylinder, or respectively adjustment cylinder 7, whereby aforesaid levers 6 and cylinders 7 are hingedly connected respectively by means of pivot pins 8 and 9 to the rear edge of the loading surface or loading platform 4.

The second end of each lever 6 is connected hingedly by means of a pivot pin 10 to a fixed part of the truck, such as for instance a cheek 11 appropriately attached to the underside of the truck, whereas aforesaid cylinders 7 are each hingedly connected by means of a pivot pin 12 also to aforesaid fixed cheeks 11.

Aforesaid cheeks 11 are in the present case attached under a hollow girder 13 which can be used as oil reservoir and which is attached in any appropriate manner under the truck.

Below girder 13, and preferably along the longitudinal axis of the vehicle, a lifting cylinder 14 is hingedly attached by means of a pivot pin 15 to the truck for instance on cheeks 16 which are also fixed under girder 13. Connecting rod 17 of this lifting cylinder 14 is hingedly attached by means of a common pivot pin 18 to aforesaid levers 6.

Each cylinder 7 consists of an upper chamber 19 and of a lower chamber 20 which are each provided with a piston, respectively 21 and 22, whereby piston rod 23 of cylinder 21 extends into lower part 20 of cylinder 7, whereas piston rod 24 of piston 22 is connected to aforesaid pivot pin 9. A seal is obviously provided around piston rod 23 (not shown in the drawing) which separates chambers 19'' and 20' from each other.

On the one hand the total surface of pistons 21 of both cylinders 7 has been determined so as to be larger than the surface of cylinder 14, and on the other hand, the surface of pistons 22 is chosen in such a manner as to be larger than the transverse cross-section of piston rod 23 but smaller than the surface of piston 21.

Cylinder 14 is provided with an inlet and with an outlet, respectively 25 and 26; the upper part 19 of cylinder 7 is provided with an inlet and an outlet, respectively 27 and 28, and the lower part of cylinder 7 with an inlet and an outlet, respectively 29 and 30.

Oil tank 13 is connected by means of a pipe 31 to a pump 32. The latter is connected by means of pipes, respectively 33 and 34, to a stop valve 35 and a control valve 36. The latter is connected to a return pipe 37 which leads back to storage tank 13. Stop valve 35 is connected to connecting points 25 and 27 of cylinders 14 and 7 of which connecting points 26 and 28 are connected directly to tank 13. Valve 36 is further connected on the one hand to connecting point 29 and on the other hand to connecting point 30 of lower point 20 of cylinder 7.

The operation and the use of the loading platform according to the invention are most simple and as follows.

We presuppose the loading platform to be resting on the ground as shown in FIG. 1.

It will hereby be observed that the piston of cylinder 14 is located in its rearmost position; that piston 21 of cylinder 7 is in an intermediate position; in other words, that respective chambers 19' and 19" are formed in the upper part of cylinder 7 and that piston 22 is located at a distance "a" from the free end of piston rod 23 of piston 21. Part 20 of cylinder 7 in a way also forms two chambers, respectively 20' and 20".

When it is desired to bring the loading platform 4 up to the height of loading floor 1 of truck 2, oil will be supplied to inlet 25 of cylinder 14 and to inlet 27 of cylinder 7. As a consequence hereof and due to the fact that the total surface of the two pistons 21 is larger than the surface of piston 14, pistons 21 will first move up to the position illustrated in FIG. 2. As a certain quantity of oil is present in chamber 20' and that this quantity is noncompressible, piston 22 will follow this movement of piston 21, whereby the displacement of piston 22 is obviously dependent upon the volume displaced by the part of piston rod 23 in chamber 20. When piston 21 has come to the end of its stroke, loading platform 4 will just have reached the horizontal position illustrated in FIG. 2.

At this moment no more fluid can enter space 19', so that all the oil is supplied to cylinder 14, with the result that piston rod 17 is pressed out and that levers 6 are rotated around their pivot pins 10. Loading platform 4 is consequently moved upward to the position shown in FIG. 3 whereby the cooperation of levers 6 with cylinders 7 assures that loading platform 4 remains parallel to itself. As can be seen in FIG. 3, pistons 21 and 22 retain the same positions as those shown in FIG. 2 during this entire movement.

In order subsequently to bring the loading platform to the vertical position, see FIG. 4, it will be sufficient to supply oil to space 20' of both cylinders 7 whereby these make the loading platform swivel around pivoting points 8.

Conversely, in order to bring the loading platform from its position shown in FIG. 4 back to the position illustrated in FIG. 1, it will be sufficient to supply oil to space 20" until the position is reached which is shown in FIG. 3, after which the actual lowering of the loading platform is performed under its own weight, the platform remaining parallel to itself.

When the loading surface 4 has reached a fixed point, such as for instance the ground as shown in FIG. 2, it will be further lowered by its own weight to the position shown in FIG. 1, whereby the lowering movement is subjected to the braking action of the displacement of piston 21.

It is perfectly clear that the use of cylinders 7 with two pistons assures that the loading platform is always maintained parallel to itself in the course of the movement, and that the automatic return of the loading platform to this position is adjusted in advance and is automatically obtained again, without having to perform any additional adjustment.

Figure 5:
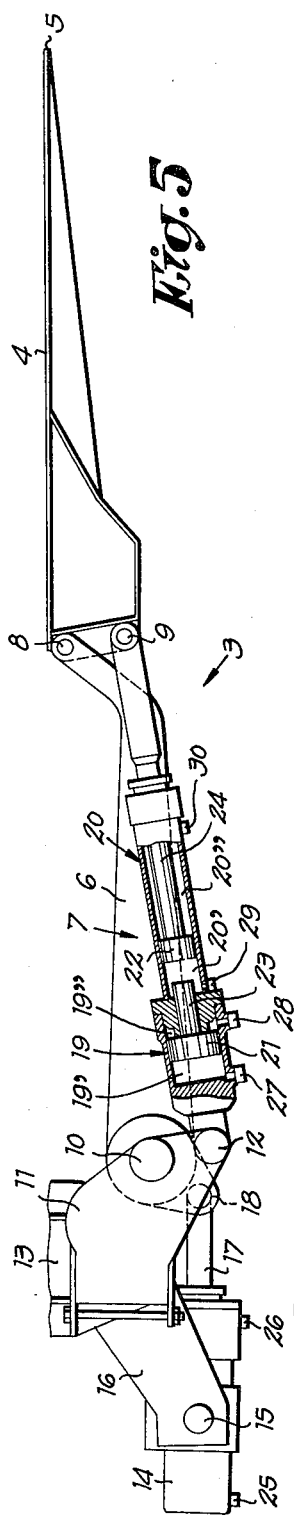

FIG. 5 illustrates an intermediate position of the loading platform in the adjustment according to FIGS. 1 to 4.

Figure 7:
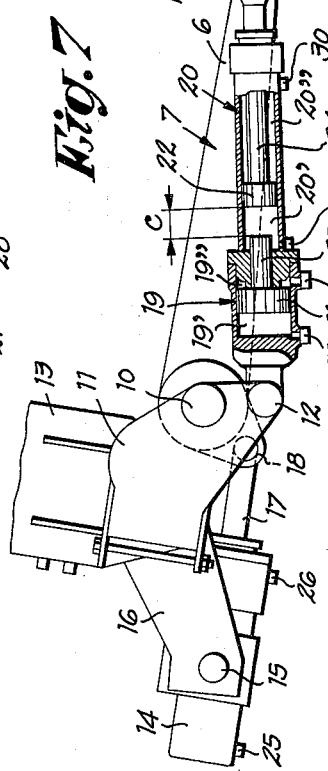
Figure 6:
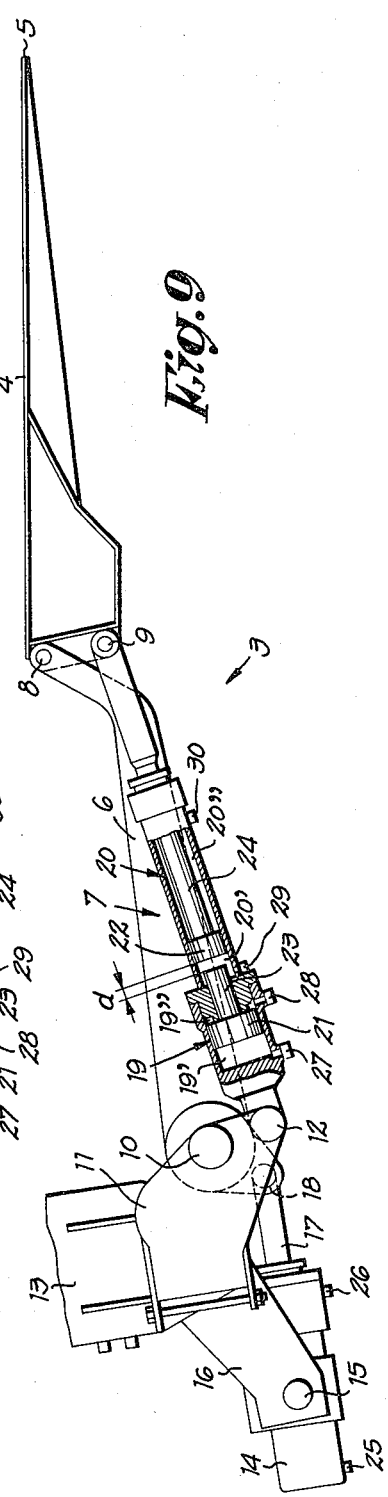

In FIGS. 6 and 7 on the one hand, and 8 and 9 on the other hand, it is shown that by providing cylinders 7 in two parts, respectively 19 and 20, one obtains that the horizontal adjustment of loading platform 4 can be assured in any position of the truck. In FIGS. 6 and 7 the truck is indeed seen to be on a slope, in the one case nose up and in the other case nose down. In both cases it remains however possible to maintain the loading platform horizontal whilst moving it from the ground up to loading floor 1 and further, due to the presence of pistons 21, to allow driving-up edge 5 of the loading platform to be lowered to the ground and subsequently, when raising the loading platform afresh, to have it automatically return to its adjusted horizontal position.

As can be seen from FIGS. 7 and 9, pistons 22 operate at that moment as correction pistons, so that in FIG. 7 they take up a position with respect to the end of piston rod 23 of piston 21 at a distance $c$ which is greater than aforementioned distance "$a$" and in FIG. 9 at a distance $d$ which is smaller than aforementioned distance "$a$".

FIG. 10 illustrates an example in which the device according to the invention, or more particularly the loading platform 4, has to cooperate with a quay 38.

In such a case the loading platform shall preferably be placed on an incline with respect to the quay so that, as shown in FIG. 10, when the truck is pressed down due to the increasing load, a certain slope towards the quay is maintained.

As for this application a relatively large slope of the loading platform is required, a locking bolt 39 is provided under each lever 6, which prevents the further lowering of the loading platform. The loading platform thus simply rests by means of its driving-up edge on the quay, which is made possible by the presence of pistons 21. Pistons 21 and 22 are at that moment located approximately in the position which they would take up when the loading platform rests on the ground as illustrated in FIG. 1.

It is perfectly clear that by means of the loading platform according to the invention the aforementioned as well as other advantages are secured which are unknown in the loading platforms used up till now.

The present invention is by no means limited to the example described above and illustrated in the appended drawings, but such a loading platform, or respectively the control device for such a loading platform, may be constructed in all sorts of shapes and dimensions without going beyond the scope of the invention.

What I claim is:

1. An entirely hydraulic loading platform assembly for trucks, including:
   a. a loading platform;
   b. lever arm means pivotally mounting said loading platform to a fixed base;
   c. lifting hydraulic cylinder means connected between said fixed base and said lever arm means, and operable to raise and lower said loading platform;
   d. adjustment hydraulic cylinder means connected between said fixed base and said loading platform, and operable to effect adjustments in the attitude assumed by said platform, said lever arm means and said adjustment hydraulic cylinder means forming a parallelogram system, and said adjustment hydraulic cylinder means comprising: at least one cylinder having a first chamber and a second chamber therein, said chambers being connected by a passageway; a first piston received within said first chamber, and having a first piston rod thereon that extends through said passageway into said second chamber, the opposite ends of said first chamber being operably connected by first conduit means with the corresponding opposite ends of the chamber of said lifting hydraulic cylinder means; and a second piston received within said second chamber, and having a second piston rod thereon that extends out of said cylinder and is connected with one of said loading platform or said fixed base; and e. second conduit means, including adjustment valve means, connecting the opposite ends of said second chamber with a source of hydraulic pressure.

2. An entirely hydraulic loading platform assembly for trucks as recited in claim 1, wherein the diameter of said second piston is larger than the diameter of said first piston rod, but smaller than the diameter of said first piston.

3. An entirely hydraulic loading platform assembly for trucks as recited in claim 1, wherein the total surface area of said first piston(s) of said hydraulic cylinder means is larger than the total surface area of the piston(s) of said lifting hydraulic cylinder means.

4. An entirely hydraulic loading platform assembly for trucks as recited in claim 1, further including locking bolt means adapted to be fitted under said lever arm means when such lever arm means is in an elevated position, to lock said lever arm means in said elevated position.

* * * * *